(12) United States Patent
Cornet et al.

(10) Patent No.: US 6,623,583 B2
(45) Date of Patent: Sep. 23, 2003

(54) BEAD HOLDER

(75) Inventors: Francis Cornet, Habay-la-Vieille (BE); Michel Lemaire, Habay-la-Neuve (BE)

(73) Assignee: The Goodyear Tire and Rubber Company, Akron, OH (US)

(*) Notice: Subject to any disclaimer, the term of this patent is extended or adjusted under 35 U.S.C. 154(b) by 130 days.

(21) Appl. No.: 09/874,444

(22) Filed: Jun. 5, 2001

(65) Prior Publication Data

US 2002/0179227 A1 Dec. 5, 2002

(51) Int. Cl.⁷ ............................................... B29D 30/48
(52) U.S. Cl. .................. 156/131; 156/403; 156/406.2
(58) Field of Search .......................... 156/131, 135, 156/136, 403, 406.2, 421.8, 422

(56) References Cited

U.S. PATENT DOCUMENTS

| | | | |
|---|---|---|---|
| 3,212,951 A | * 10/1965 | Porter | 156/421.8 |
| 3,556,900 A | 1/1971 | Edney et al. | 156/403 |
| 3,839,115 A | 10/1974 | Leblond et al. | 156/131 |
| 3,849,231 A | 11/1974 | Brey et al. | 156/403 |
| 3,909,335 A | 9/1975 | Jellison | 156/396 |
| 4,430,143 A | * 2/1984 | Aihara | 156/403 |
| 4,437,920 A | 3/1984 | Kubo | 156/406 |
| 4,604,158 A | 8/1986 | Broyles | 456/403 |
| 4,726,861 A | 2/1988 | Vorih et al. | 156/131 |
| 4,964,931 A | 10/1990 | Ring | 156/131 |
| 5,051,149 A | 9/1991 | Ishii | 156/403 |
| 5,858,165 A | 1/1999 | Takasuga | 156/403 |
| 5,861,073 A | 1/1999 | Gazuit et al. | 156/117 |

* cited by examiner

*Primary Examiner*—Geoffrey L. Knable
(74) *Attorney, Agent, or Firm*—Brouse McDowell; Roger D. Emerson

(57) ABSTRACT

A tire bead holder assembly for centering and gripping a circular tire bead before placement on a bead setter has circumferentially spaced radially moveable fingers actuated by a chain drive for simultaneous controlled movement of the fingers and application of centering pressure without distortion of the bead.

8 Claims, 5 Drawing Sheets

BEAD HOLDER

BACKGROUND OF THE INVENTION

1. Field of Invention

This invention relates to tire building and especially centering and placing a circular tire bead on a bead setter for application to a tire carcass built on a tire building drum.

2. Description of the Related Art

In the building of a tire, a bead or bead apex assembly is fabricated at a position away from the tire building drum and then applied to the plies which have been positioned on the tire building drum during revolutions of the drum. At the time the bead or bead apex assembly is applied to the tire casing which has been built on the drum, it is important that the beads be set in a cylindrical configuration and in a centered position relative to the cylindrical drum on which the carcass is built. It has been found that this operation cannot be done manually with the necessary precision and therefore a tire bead holder is needed for gripping the circular tire bead and placing the bead in a circular condition at a concentric position on a bead setter. The bead is held on the bead setter by magnets in the position it is received and is then carried to the tire building drum where it is applied to the tire carcass. In U.S. Pat. No. 4,726,861 a tire bead centering and feeding apparatus is proposed where the beads are supported and centered on hinged arms having bead supporting fingers which engage the bead as the hinged arms are moved about a swinging axis. The movement of the hinged arms causes the fingers to be applied unevenly which may result in deviations in the centering of the bead.

SUMMARY OF THE INVENTION

The present invention is directed to an improved tire bead holder assembly in which the bead holding fingers are moved simultaneously and equally in a radial direction to center and hold the bead or bead apex assembly. A direct drive chain is connected to radially moveable slides for supporting the fingers providing substantially equal centering forces on circumferentially spaced portions of the bead. A simple piston cylinder assembly connected to the chain drive provides the simultaneous movement of the fingers.

In accordance with one aspect of the invention, there is provided a tire bead holder assembly for gripping a circular tire bead and placing the bead in a concentric position on a bead setter comprising a supporting disk, a plurality of circumferentially spaced radially extending linear guide members on the disk characterized by slide members mounted on each of the guide members, each of the slide members having an axially extending bead holding finger for engaging the bead and a radially moveable drive means in engagement with each of the slide members for moving each of the slide members and each axially extending finger radially into and out of engagement with the tire bead.

In accordance with another aspect of the invention, there is provided a method of holding and positioning a tire bead for transfer to a bead setter from a bead holder comprising:

a. placing the bead over a plurality of circumferentially spaced fingers mounted on radially moveable slide members;

b. moving said slide members with a chain adjacent and attached to each of the slide members to provide simultaneous radially outward movement of each of the fingers into centering and gripping engagement with the bead.

c. applying pressure by the fingers on the bead with the forces from the chain applied by a piston cylinder assembly;

d. moving the fingers into an opening in the bead setter providing for engagement of the bead with the bead setter in a centered position;

e. applying a retaining force on the bead by the bead setter;

f. releasing the bead by moving the fingers radially inward; and, g. retracting the bead holder from the bead setter;

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and herein.

DESCRIPTION OF THE PREFERRED EMBODIMENT

Figure 1:
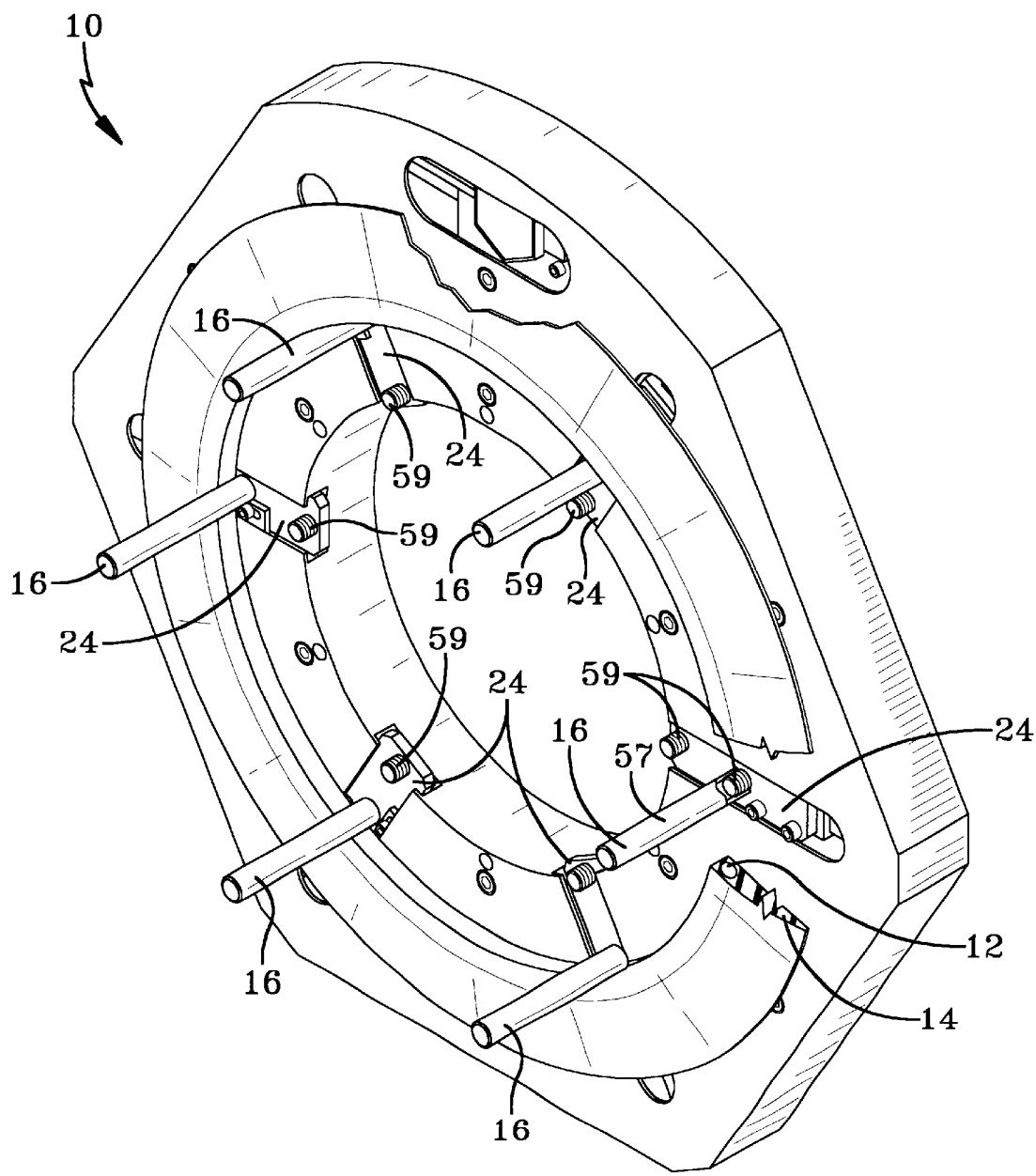
FIG. 1 is a view in perspective of the bead holder embodying the invention showing a bead apex assembly with parts being broken away centered and held in position on the bead holder.
Figure 2:
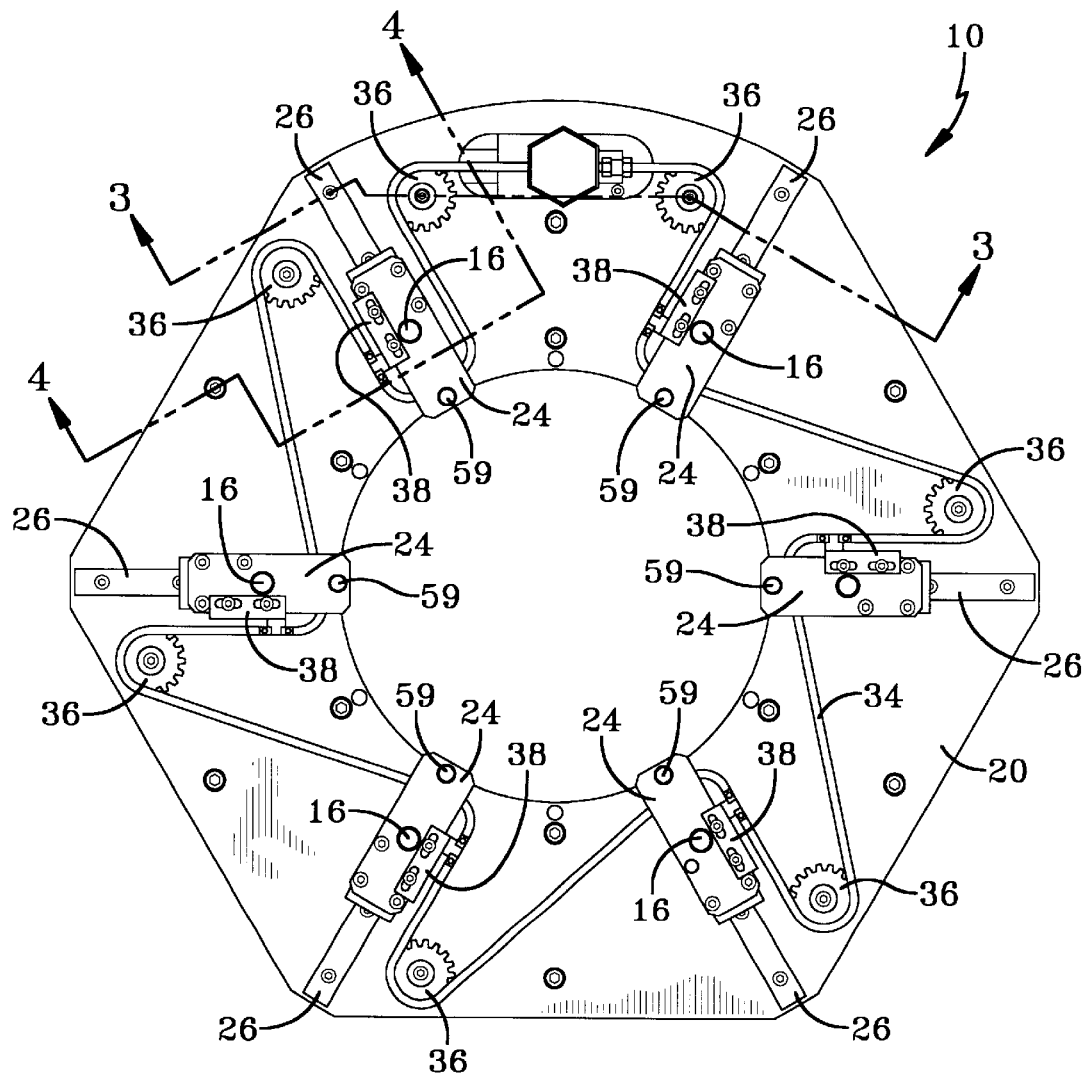
FIG. 2 is a front view of the bead holder with the cover removed.
Figure 3:
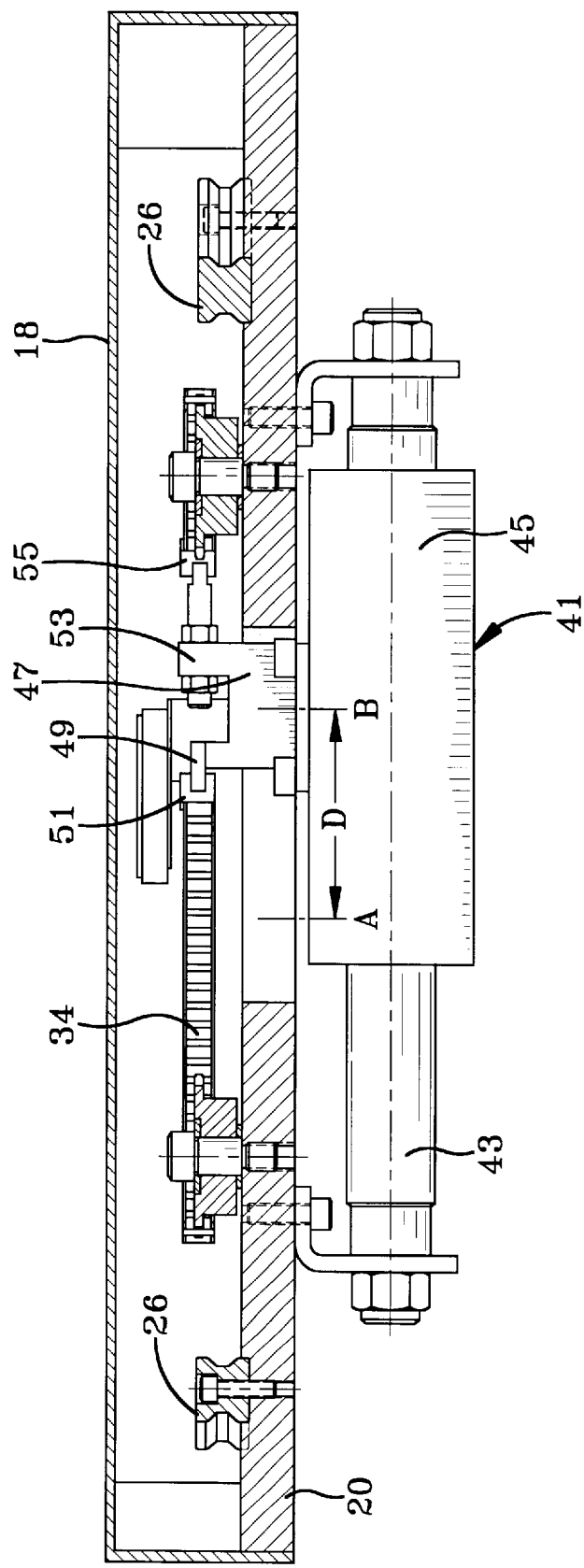
FIG. 3 is a sectional view taken along the line 3—3 in FIG. 2.
Figure 4:
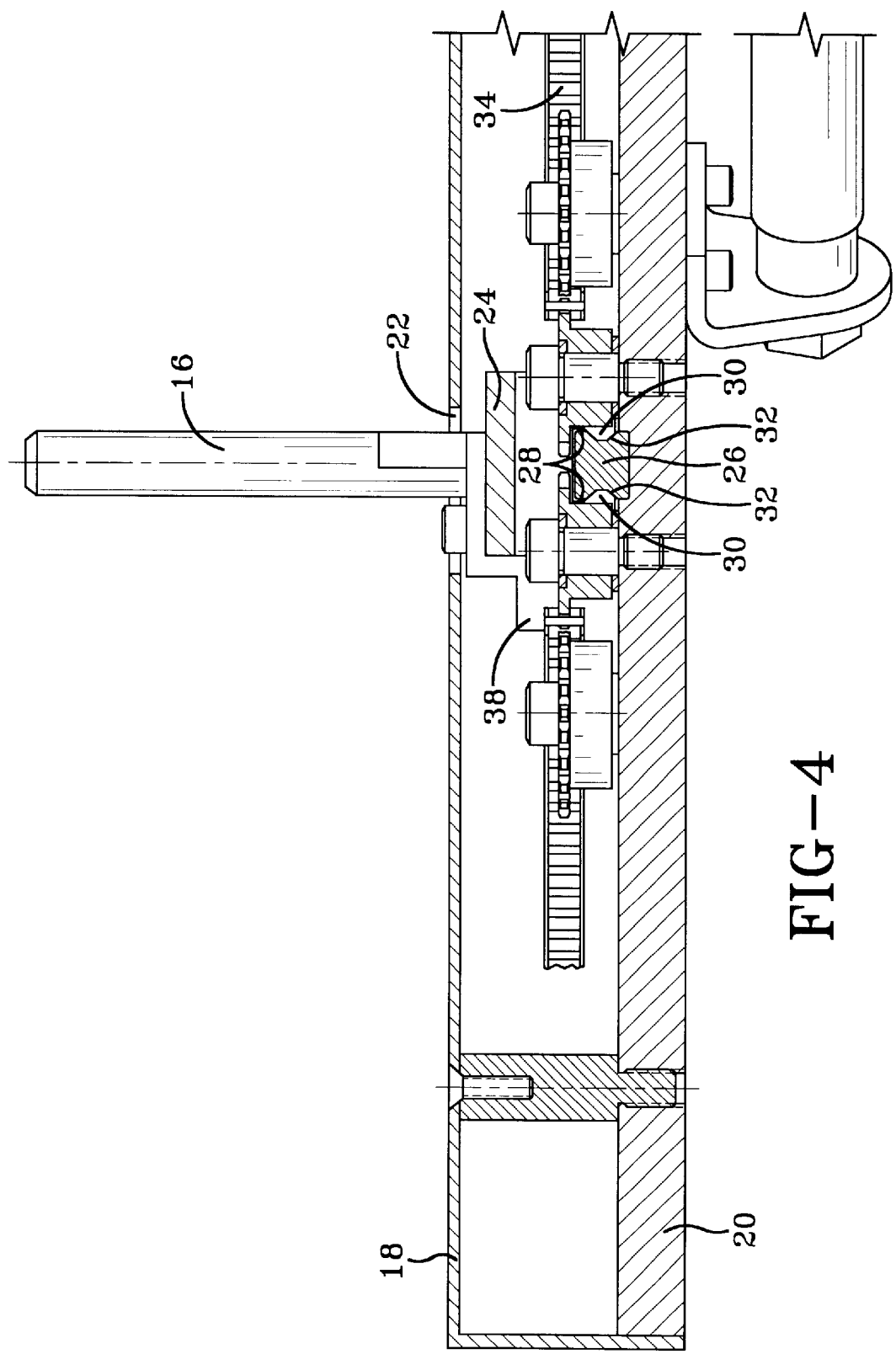
FIG. 4 is a sectional view taken along the line 4—4 in FIG. 2.

Referring to FIG. 1 a tire bead holder assembly 10 is shown supporting a bead 12 and apex 14 which have been fabricated at another location and hung over bead holding fingers 16 at circumferentially spaced positions around the bead holder assembly 10. A cover 18 is mounted on a supporting disk 20 and has slots 22 through which the fingers 16 extend. As shown in FIGS. 2 and 3, the fingers 16 are mounted on slide members 24 each of which is slidably mounted on a linear guide member 26 fastened to the disk 20 at circumferentially spaced positions in a radially extending direction. As shown in FIG. 4 each of the slide members 24 may have a slot 28 with ribs 30 for sliding engagement with slide grooves 32 in the guide member for guiding the radial movement of the slide member 24.

As shown in FIGS. 2, 3, and 4 a chain 34 is guided by sprockets 36 over a drive path extending alongside each of the slide members 24 which are connected to the chains by clamps 38 to provide for simultaneous radial movement of the slide members and the fingers 16 as the chain 34 is moved by a suitable power means such as piston cylinder assembly 41 shown in FIG. 3. A piston 43 of the assembly 41 is mounted on the disk 20 and the moveable cylinder 45 has a saddle member 47 with a hook 49 attached to a first end 51 of the chain 34 and an adjustable connection 53 connected to the second end 55 of the chain. Suitable connections to the piston cylinder assembly 41 provide for moving the cylinder 45 carrying the saddle 47 with the chain 34 between positions A and B causing the slide members 24 to move radially carrying the fingers 16 into engagement with the bead 12 by regulating the pressure in the cylinder 45. The force applied by the finger 16 to the bead 12 can be adjusted so that there is no distortion of the bead 12 and apex 14 as it is being grasped by the tire bead holder assembly 10.

Referring to FIG. 1 the fingers 16 are mounted on the slide members 24 by threading a socket 57 in each of the fingers over threaded studs 59 on the surface of the slide members 24. The studs 59 may be spaced radially for mounting the fingers 16 at different radii such as 13 inches (33.02 cm) and 17 inches (43.18 cm).

Figure 5:
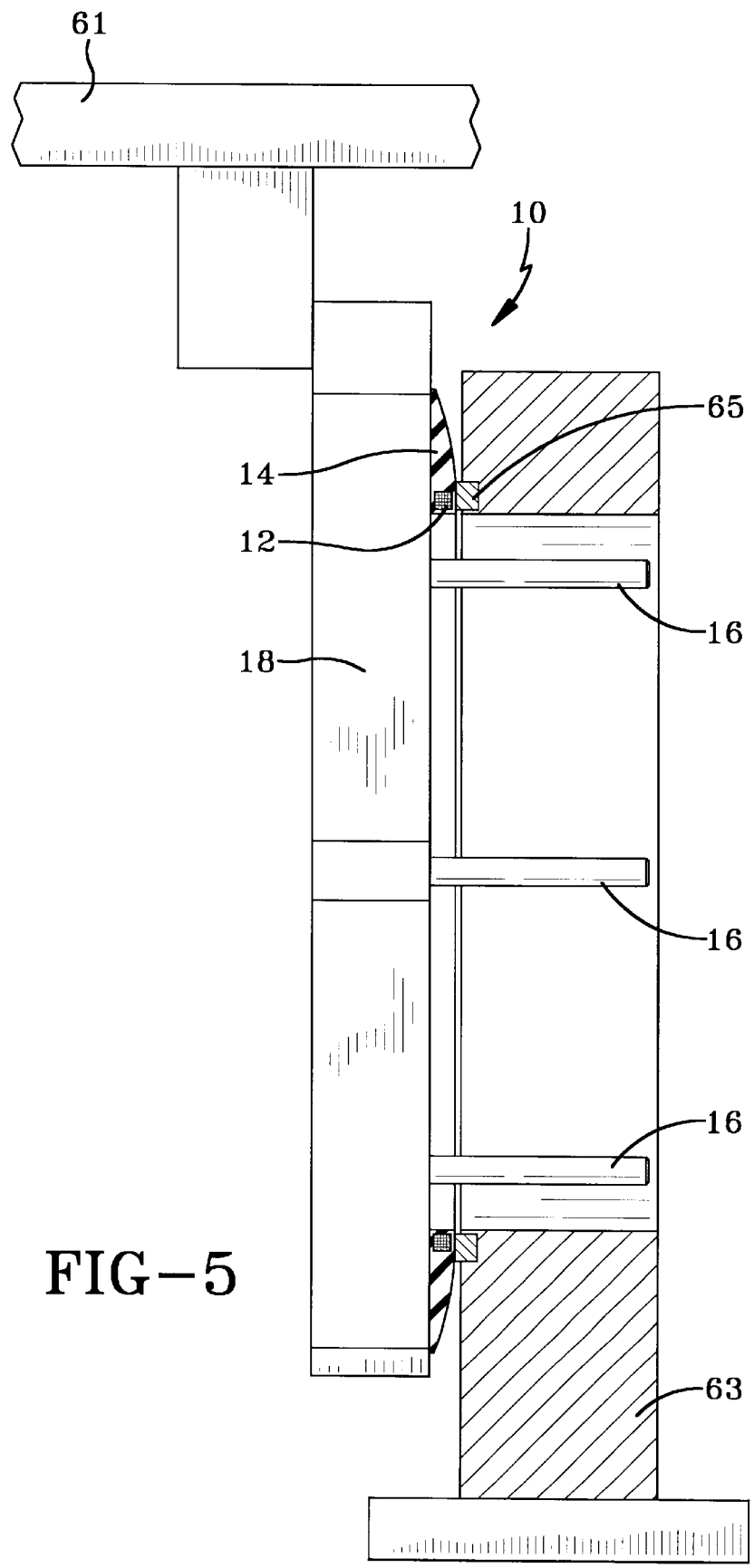
FIG. 5 is a schematic side elevation showing the transfer of the bead from the bead holder to the bead setter.

In operation the tire bead holder assembly 10 may be mounted on a suitable conveyor 61 shown schematically in FIG. 5 for carrying the bead 12 and apex 14 into engagement with a bead setter 63 shown in section which may have magnets 65 for holding the bead 12. In a centered position ready for application to the tire building drum by the bead setter. After the application of the bead 12 to the bead setter 63 the fingers 16 may be retracted radially by actuating the piston cylinder assembly 43 and the bead holder assembly 10 may then be moved away from the bead setter.

While a certain representative embodiment and details have been shown for the purpose of illustrating the invention, it will be apparent to those skilled in the art that various changes and modifications may be made therein without departing from the scope of the invention.

What is claimed is:

1. A tire bead holder assembly for gripping a circular tire bead and placing said bead in a concentric position on a bead setter comprising a supporting disk, a plurality of circumferentially spaced radially extending linear guide members, each of said slide members having an axially extending bead holding finger for engaging said bead and a radially movable drive means in engagement with each of said slide members for moving each of said slide members and each said axially extending finger radially into and out of engagement with said tire bead, said drive means having a chain attached to each of said slide members and sprockets rotatably mounted on said disk for guiding said chain in a radial direction adjacent at least one side of each of said slide members to move said slide members radially in response to movement of said chain and means for moving said chain.

2. A tire bead holder in accordance with claim 1 further characterized by each of said slide members having a slot for sliding engagement with one of said linear guide members.

3. A tire bead holder in accordance with claim 2 further characterized by each of said guide members having radially extending side grooves and each said slot having side ribs in sliding engagement with said side grooves for guiding the radial movement of each of said slide members.

4. A tire bead holder in accordance with claim 1 further characterized by said drive means comprising a double acting piston-cylinder assembly with said chain connected to said cylinder and said piston mounted on said supporting disk.

5. A tire bead holder assembly in accordance with claim 1 further characterized by each of said slide members having at least two radially spaced fasteners for mounting said bead holding finger to provide for gripping and placing beads of different diameters by fastening said finger at different radial positions.

6. The tire bead holder assembly in accordance with claim 5 further characterized by each of said fasteners comprising a threaded stud mounted on each said slide member and a threaded socket mounted on said bead holding finger.

7. A method of holding and positioning a tire bead for transfer to a bead setter from a bead holder comprising:

(a) placing said bead over a plurality of circumferentially spaced fingers mounted on radially moveable slide members of said bead holder;

(b) moving said slide members with a chain adjacent and attached to each of said slide members to provide simultaneous radially outward movement of each of said fingers into centering and gripping engagement with said bead;

(c) applying pressure by said fingers on said bead with said forces from said chain applied by a piston cylinder assembly;

(d) moving said bead holder toward said bead setter with said fingers extending into an opening in said bead setter providing for engagement of said bead with said bead setter in a centered position;

(e) applying a retaining force on said bead by said bead setter;

(f) releasing said bead from said bead holder by moving said fingers simultaneously radially inward with said chain and, (g) retracting said bead holder from said bead setter.

8. The method of claim 7 characterized by said bead holder being mounted on a conveyor for conveying said bead holder from a position spaced from said bead setter to said centered position on said bead setter.

* * * * *